(12) United States Patent
Baek et al.

(10) Patent No.: US 9,770,848 B2
(45) Date of Patent: Sep. 26, 2017

(54) LOW DENSITY INORGANIC POWDER INSULATOR USING EXPANDED PERLITE, METHOD FOR MANUFACTURING SAME AND MOLD MACHINE FOR MANUFACTURING SAME

(71) Applicant: KYUNGDONG ONE CORPORATION, Seoul (KR)

(72) Inventors: Bum Gyu Baek, Ulsan-si (KR); Dae Woo Nam, Asan-si (KR)

(73) Assignee: KYUNGDONG ONE CORPORATION, Seoul (KR)

( * ) Notice: Subject to any disclaimer, the term of this patent is extended or adjusted under 35 U.S.C. 154(b) by 304 days.

(21) Appl. No.: 14/416,268

(22) PCT Filed: Aug. 7, 2013

(86) PCT No.: PCT/KR2013/007140
§ 371 (c)(1),
(2) Date: Jan. 21, 2015

(87) PCT Pub. No.: WO2014/025210
PCT Pub. Date: Feb. 13, 2014

(65) Prior Publication Data
US 2015/0209981 A1     Jul. 30, 2015

(30) Foreign Application Priority Data

Aug. 7, 2012  (KR) .................. 10-2012-0086220

(51) Int. Cl.
C04B 30/00     (2006.01)
C04B 14/18     (2006.01)
(Continued)

(52) U.S. Cl.
CPC ............... B29C 43/02 (2013.01); B28B 3/02 (2013.01); B28B 3/126 (2013.01); B28B 7/44 (2013.01);
(Continued)

(58) Field of Classification Search
None
See application file for complete search history.

(56) References Cited

U.S. PATENT DOCUMENTS 3,418,403 A     12/1968  Garnero
4,564,547 A  *  1/1986  Hughes ................. B29C 53/066
                                                         156/276

(Continued)

FOREIGN PATENT DOCUMENTS

CN     101128404 A    2/2008
EP     2 543 652 A2   1/2013
(Continued)

OTHER PUBLICATIONS

PCT International Search Report, PCT/KR2013/007140, Oct. 11, 2013, 6 Pages.

(Continued)

*Primary Examiner* — Mary F Theisen
(74) *Attorney, Agent, or Firm* — Fenwick & West LLP

(57) ABSTRACT

The present invention relates to a method for manufacturing a low density inorganic powder insulator having a low density molded structure using expanded perlite without a binder and a mold machine for manufacturing the same, and more particularly, to a technology of uniformly dispersing perlite particles having a shape of irregular fragments of glass using expanded perlite to form a framework among synthetic silica to improve molding strength even at a low density, thereby reducing thermal conductivity (conduction and convection blocking) due to a low density and an (Continued)

increase in a specific surface area. Further, the present invention relates to a method for manufacturing a low density inorganic powder insulator having a molded structure using economical expanded perlite having excellent physical properties by compression-molding a clad sheet material using a mold machine having a porous plate and a filter so as to remove pressure and air, which are generated during compression due to the use of the clad sheet material having low specific gravity and a large specific surface area, from a molded product or manufacturing the clad sheet material into a compressed clad sheet using a compression roller, and a mold machine for manufacturing the same.

21 Claims, 3 Drawing Sheets

(51) Int. Cl.
| | | |
|---|---|---|
| *F16L 59/02* | (2006.01) | |
| *E04B 1/74* | (2006.01) | |
| *E04B 1/80* | (2006.01) | |
| *B29C 43/02* | (2006.01) | |
| *B28B 3/02* | (2006.01) | |
| *B28B 3/12* | (2006.01) | |
| *B28B 7/44* | (2006.01) | |
| *B30B 15/00* | (2006.01) | |
| *C04B 111/40* | (2006.01) | |
| *F16L 59/065* | (2006.01) | |
| *B29K 105/00* | (2006.01) | |

(52) U.S. Cl.
CPC .......... B30B 15/0017 (2013.01); C04B 30/00 (2013.01); *B29K 2105/00* (2013.01); *C04B 2111/40* (2013.01); *E04B 1/80* (2013.01); *E04B 2001/742* (2013.01); *F16L 59/028* (2013.01); *F16L 59/065* (2013.01); *Y02W 30/94* (2015.05)

(56) References Cited

U.S. PATENT DOCUMENTS

| | | |
|---|---|---|
| 5,139,722 A | 8/1992 | Lawton |
| 2002/0193234 A1 | 12/2002 | Oda et al. |
| 2008/0277617 A1 | 11/2008 | Abdul-Kader et al. |
| 2011/0120620 A1* | 5/2011 | Hiemeyer ............. F16L 59/065 156/70 |
| 2012/0326072 A1* | 12/2012 | Baek ..................... C04B 14/185 252/62 |

FOREIGN PATENT DOCUMENTS

| | | |
|---|---|---|
| JP | S56-063858 A | 5/1981 |
| JP | S60-088295 A | 5/1985 |
| JP | S63-303877 A | 12/1988 |
| JP | S64-067302 A | 3/1989 |
| JP | 06-033853 B2 | 5/1994 |
| JP | 2001-262067 A | 9/2001 |
| JP | 2002-193684 A | 7/2002 |
| JP | 2004-517018 A | 6/2004 |
| JP | 2007-510794 A | 4/2007 |
| JP | 2008-533402 A | 8/2008 |
| JP | 2010-522312 A | 7/2010 |
| KR | 2007-0112472 A | 11/2007 |
| KR | 10-2011-0100989 A | 9/2011 |
| WO | WO 96/27754 A1 | 9/1996 |
| WO | WO 00/28809 A1 | 5/2000 |
| WO | WO 2008/118773 A1 | 10/2008 |
| WO | WO 2011/108856 A2 | 9/2011 |

OTHER PUBLICATIONS

Chinese Second Office Action, Chinese Application No. 201380041440.5, Mar. 28, 2016, 7 pages (with concise explanation of relevance).

* cited by examiner

[Fig. 1]
(A)
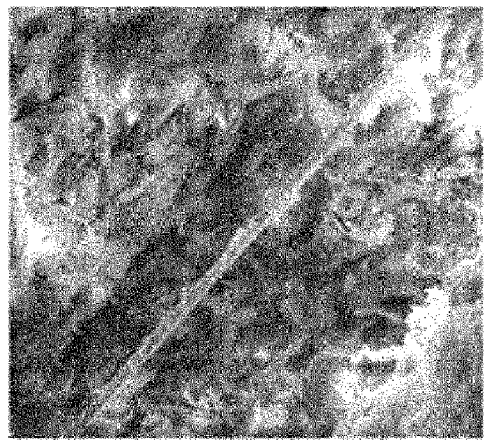
(B)
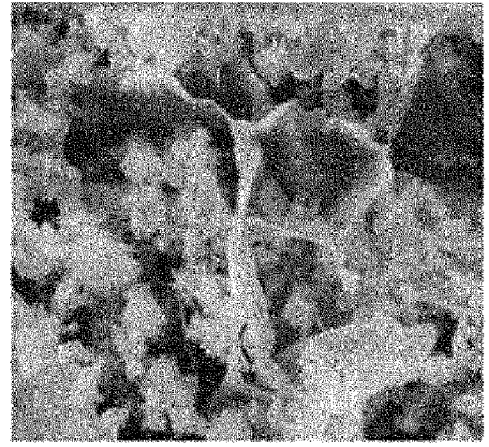
(C)
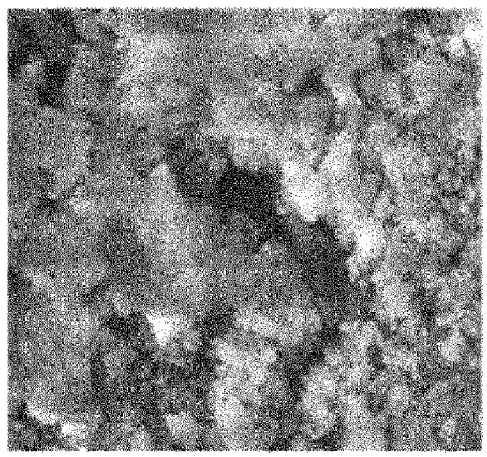
(D)
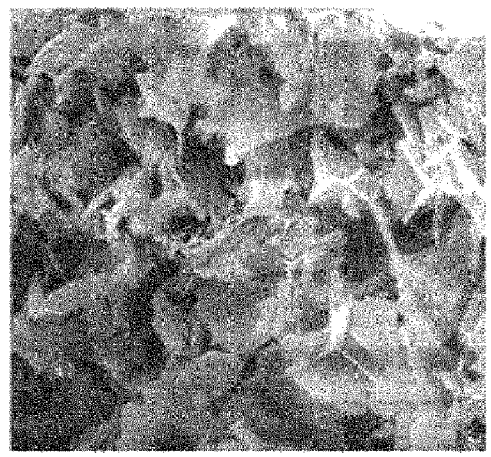

[Fig. 2]
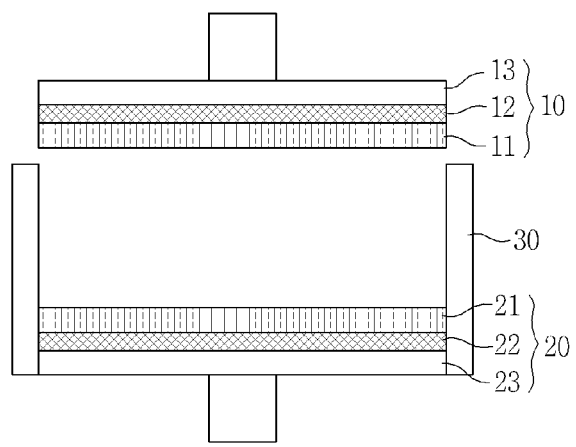
[Fig. 3]
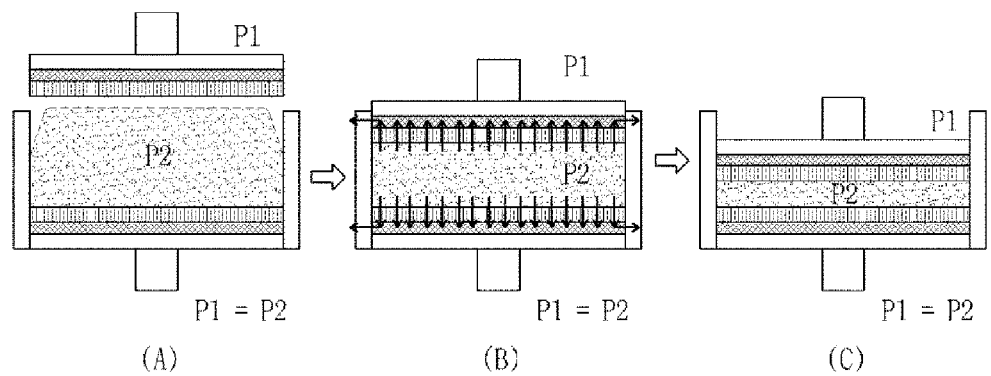

[Fig. 4]
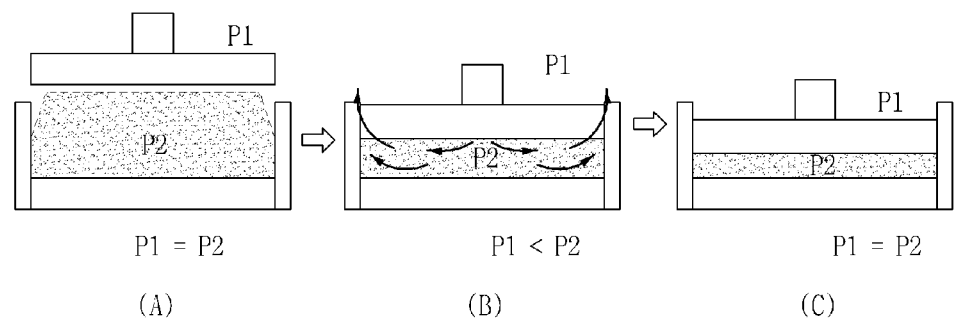
PRIOR ART
[Fig. 5]
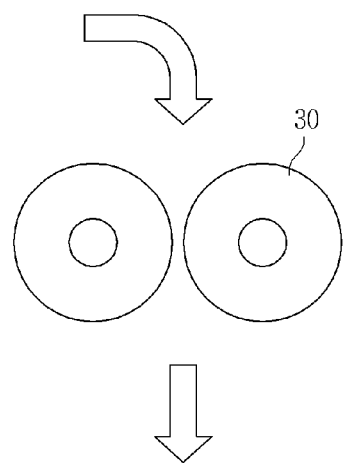

LOW DENSITY INORGANIC POWDER INSULATOR USING EXPANDED PERLITE, METHOD FOR MANUFACTURING SAME AND MOLD MACHINE FOR MANUFACTURING SAME

TECHNICAL FIELD

Exemplary embodiments of the present invention relate to a method for manufacturing an inorganic powder insulator having a low density molded structure containing expanded perlite, without a binder and a mold machine for manufacturing the same, and more particularly, to an insulator capable of improving molding strength even at a low density and reducing thermal conductivity by manufacturing expanded perlite into perlite particles having a shape of irregular fragments of glass by using a high speed mixer and uniformly dispersing the perlite particles to form a framework among synthetic silicas. Further, exemplary embodiments of the present invention relate to a method for manufacturing an inorganic powder insulator having a low density molded structure using economical expanded perlite having excellent physical properties by compression-molding a clad sheet using a mold machine having a porous plate and a filter so as to remove pressure and air, which are generated during compression, from a molded product in a method for manufacturing the insulator or manufacturing a compressed clad sheet having the molded structure using the expanded perlite using a compression roller, and a mold machine for manufacturing the same.

BACKGROUND ART

Most synthetic silica is bound with nanosized particles to be manufactured as microsized particles and forms a large specific surface area due to the nanosized particles. An inside of the synthetic silica has a large specific surface area by compression-molding the nanosized particles, and thus the synthetic silica has low thermal conductivity, thereby manufacturing an insulator having good insulation performance.

The so manufactured insulator is used alone or is covered with an outer cover of a glass fiber, and the like for strength reinforcement and used as a vacuum insulator by being sealed with an outer cover of a multilayer film of an aluminum material.

A core of the insulator of the synthetic silica has a large specific surface area due to small pores formed therein and thus the insulator has low thermal conductivity, such that insulation performance of the insulator may be improved.

Generally, a binder needs to be used to have moldability at the time of manufacturing the insulator using the synthetic silica particles. Even though a small amount of binder is used, the synthetic silica has a reduced specific surface area formed therein due to the binder. In particular, particles having many pores formed therein, such as synthetic silica, absorb a considerable amount of liquid phase binder and therefore may hardly be dispersed uniformly.

Due to the phenomenon and since it is difficult to completely dry moisture included in the binder, the thermal conductivity is increased and the insulation performance may be reduced correspondingly.

To solve the above problems, products using an inorganic fibrous mat as an outer cover have been commercialized. However, the synthetic silica itself may be used at 800 to 900° C. or more, but the inorganic fiber may have a limited use temperature according to a kind of inorganic fiber, which is a factor of increasing material costs and increasing prices of an insulator due to additional processing. A general glass fiber has a limited use temperature of about 650° C. and a ceramic fiber may be used at 800 to 900° C. or more, but needs to use a biodegradable material which has no effect on a human body and therefore is expensive.

Further, the insulator has a core enclosed with the outer cover of the multilayer film of an aluminum material and has an inside subjected to vacuum processing, and thus is used as a core of a vacuum insulator having insulating physical property which is thermal conductivity of 0.005 W/mK or less.

Meanwhile, a core of the vacuum insulator relies on long-term durability (service life) which relies on whether the internal vacuum is damaged. A degree of vacuum is damaged by a damage of the outer cover and out gassing which is generated due to internal moisture, organic matters, and the like. The vacuum damage may be prevented by a getter, but may be completely prevented.

In "Thermal Insulation And Method Of Producing thereof" of Korean Patent Laid-Open Publication No. 10-2011-0042019, a method for using alkali-earth metals hydroxide and alkali metal hydroxide so as not to use a binder and curing the alkali-earth metals hydroxide and the alkali metal hydroxide under high humidity and drying them again has been proposed. However, the method has a problem in that a process may be complicated, and moisture may be absorbed into the insulator at the time of the high-humidity curing and thus it may be difficult to completely remove the internal moisture even though the alkali-earth metals hydroxide and the alkali metal hydroxide is dried again.

In "Method Of Manufacturing High Temperature Insulation Flexible Blanket Formed Of Silica Aerogel With Non-woven Glass Fibre Batting And, The Blanket Manufactured By The Method" of Korean Patent Laid-Open Publication No. 10-2010-0083543, a method for stacking an insulator manufactured by producing a non-woven film of a chemical fiber, a carbon fiber, a glass fiber, and the like, applying an organic adhesive on the non-woven film, and adsorbing silica areogel thereon and stitching the insulator with a W-shaped needle has been proposed. However, the method uses a non-solvent type organic adhesive to somewhat prevent the organic adhesive from being absorbed into the silica aerogel but has a problem in that a process may be complicated, manufacturing costs may be increased, and adhesion with the organic adhesive after the manufacturing may be weak to generate dust.

DISCLOSURE

Technical Problem

An embodiment of the present invention is directed to providing a method for manufacturing a low density inorganic powder insulator capable of preventing an internal specific surface area from reducing by forming a framework among synthetic silica using expanded perlite in manufacturing a synthetic silica insulator to improve a reinforcing limitation by a fiber without using a binder.

The present invention is to contribute to provide an economical insulator with good physical properties by preventing the internal specific surface area from reducing and having moldability at a low density, without using the binder.

Technical Solution

In accordance with an embodiment of the present invention, a method for manufacturing an inorganic powder insulator having a low density molded structure containing expanded perlite includes:

a first step of dispersing and pulverizing the powder including the synthetic silica and the expanded silica to mix particulate synthetic silica with glass fragmented expanded perlite, being coated and dispersed on a surface of the glass fragmented expanded perlite; and a second step of manufacturing a core by compression-molding the mixed powder by a mold machine to discharge an internal pressure generated during the compression process to the outside through a plurality of pores formed on an upper plate and a lower plate.

The insulator manufactured by the present invention may include 50 to 98 wt % of synthetic silica and 2 to 50 wt % of expanded perlite and particulate synthetic silica may be compression-molded in a state in which it is mixed with the glass fragmented expanded perlite, being coated and dispersed on a surface of the glass fragmented expanded perlite.

According to the method for manufacturing a low density inorganic powder insulator according to the present invention, the expanded perlite may be fragmented at a size of particles from 300 μm to 1 μm by the high speed mixer which is equal to or more than 1000 rpm when the synthetic silica and the expanded perlite are mixed and the synthetic silica particles may be coated and dispersed on the fragmented expanded perlite, such that the expanded perlite particles forms the framework of the molded product.

In accordance with another embodiment of the present invention, a mold machine for manufuacting a low density inorganic powder insulator includes:

an upper plate configured to include an upper porous plate provided with a plurality of pores, an upper filter positioned on the upper porous plate, and an upper press plate positioned on the upper filter;

a lower plate configured to include a lower porous plate provided with a plurality of pores, a lower filter positioned beneath the lower porous plate, and a lower press plate positioned beneath the lower filter; and side plates configured to form side walls of the upper plate and the lower plate.

According to the exemplary embodiments of the present invention, it is possible to compression-mold the insulator by using the mold machine which prevents the structure formed after the mixing from being changed and the framework of the expanded perlite from being seriously damaged, at the time of manufacturing the insulator. Further, it is possible to use the method for simultaneously compressing the molded core from the top and from the bottom to improve the density deviation between the upper and lower portions of the molded core and the non-uniform internal specific surface area.

Further, according to the exemplary embodiments of the present invention, it is possible to use the general mold machine or provide the method for manufacturing an insulator using the compressed particles, by uniformly dispersing the perlite particles having the shape of irregular fragments of glass using the expanded perlite to form the framework among the synthetic silicas and then manufacturing the clad sheet compressed by the compression roller.

Advantageous Effects

According to the method for manufacturing a low density inorganic powder insulator and the mold machine in accordance with the exemplary embodiments of the present invention, it is possible to economically manufacture the inorganic powder insulator having the low density molded structure having the excellent insulation performance, by making the molded strength excellent and preventing the density deviation from occurring even at the low density to make the internal specific surface area uniform.

DESCRIPTION OF DRAWINGS

FIG. 1A is an electron micrograph of a cut surface of an insulator manufactured according to an exemplary embodiment of the present invention.

FIG. 1B is a partially enlarged photograph of FIG. 1A.

FIG. 1C is an electron micrograph of a coagulated portion of silica in the cut surface at the time of simple mixing molding.

FIG. 1D is an electron micrograph of a coagulated portion of perlite in the cut surface at the time of simple mixing molding.

FIG. 2 is a cross-sectional view of a compression mold machine according to an exemplary embodiment of the present invention.

FIG. 3 is a diagram illustrating a pressure and a discharge flow of air which are generated at the time of performing compression molding by the compression mold machine according to the exemplary embodiment of the present invention.

FIG. 4 is a diagram illustrating a pressure and a discharge flow of air which are generated at the time of performing compression molding by the compression mold machine according to the related art.

FIG. 5 is a diagram illustrating a compression flow using a compression roller.

BEST MODE

To achieve the above objects, a low density inorganic powder insulator having a molded structure containing expanded perlite according to an exemplary embodiment of the present invention includes 50 to 98 wt % of synthetic silica and 2 to 50 wt % of expanded perlite. In detail, a method for manufacturing a low density inorganic powder insulator includes a first step of simultaneously dispersing and pulverizing a powder including 50 to 98 wt % of synthetic silica and 2 to 50 wt % of expanded perlite by a high speed mixer of 1000 rpm or more to coat, disperse, and mix particulate synthetic silica particles on a surface of expanded perlite particles having a shape of fragments of glass; and a second step of manufacturing a core by compression-molding the mixed inorganic powder by a mold machine smoothly removing an internal pressure at the time of molding the mixed inorganic powder.

Further, the inorganic powder mixed after the first step is compressed by a compression roller to manufacture a clad sheet.

An effect of the present invention will be described below in more detail.

A molded product having a specific surface area formed therein has thermal conductivity lower than that of a molded product no having a specific surface area formed therein. The reason is that the specific surface area formed within the core blocks an effect of convection to prevent a heat transfer. Further, conduction is property of a material itself and therefore has a constant value. To minimize the affect of conduction, it is best to reduce an area and a density of a structure in which the internal specific surface area is formed.

The typical insulator using synthetic silica uses a binder to ensure moldability or an excessive amount of reinforced fiber. Alternatively, a usage of the binder and the reinforced fiber is appropriately determined by using both of the binder and the reinforced fiber. However, in the case of using the binder, the specific surface area formed within the insulator is reduced and thus insulation performance is reduced. As a result, in the case of increasing the usage of the reinforced fiber to reduce the usage of the binder, a coagulation phenomenon, a reduction in dispersibility, a post-molding restoring force, and the like of the fiber are increased and thus physical properties of the molded product are reduced again, such that the above problems may not be solved only by the reinforced fiber.

Therefore, the present invention is to manufacture a lower density insulator which prevents the internal specific surface area from reducing due to the binder and overcomes the limitation of the reinforced fiber.

Hereinafter, the mixing of the synthetic silica with the expanded perlite in the first step will be described.

The expanded perlite according to the exemplary embodiment of the present invention is collectively referred to as materials which are expanded by vitrificating surfaces of natural minerals such as pearlstone, pitchstone, obsidian, pumice stone, and the like with high temperature flame and vaporizing moisture (crystal water) therein. A shape of the expanded perlite particles is characteristically defined depending on a size and a dispersion of the pre-expansion particles and an amount of crystal water depending on drying and the manufactured expanded perlite has countless cells formed within particles thereof and thus has a wide specific surface area and has a low specific gravity, such that the expanded perlite has an appropriate condition as an insulation material.

The synthetic silica which includes silica having a purity of 90% or more is an inorganic matter having excellent insulation physical properties and is collectively referred to as fumed silica, porous silica, aerogel, white carbon, and the like of which the particles have a size from several nanometer to tens of micro and may have hydrophilicity and hydrophobicity depending on a processing method during the process.

The expanded perlite has a large particle and the synthetic silica has a small particle, and therefore a density difference between the particle of the expanded perlite and the particle of the synthetic silica occurs. The expanded perlite and the synthetic silica are not uniformly dispersed at the time of the simple mixing but show the coagulation phenomenon or layer separation phenomenon due to the size and density of the particles.

The present invention is not the simple mixing of different particles. The reason is that the coagulation phenomenon, the layer separation phenomenon, or the like as described above occurs at the time of the simple mixing, According to the exemplary embodiment of the present invention, the expanded perlite is pulverized at an appropriate size by the high speed mixer and is dispersed among the synthetic silica to have a structure serving as a framework among the synthetic silica. Describing in more detail, the synthetic silica has high hygroscopicity of moisture in the atmosphere or has a coagulated shape having a size of tens of micro due to electrostatic attraction between particles, but the particles may be instantly separated by a strong force or a pressure from the outside. Coating and dispersing the synthetic silica particle on the surface of the perlite particle which is pulverized to 1 to 300 μm instantly separates the synthetic silica to be at an original size by a high rpm and a force of the high speed mixer and dispersing the separated synthetic silica and coating the fine particles on the surface of the expanded perlite particle so as to be attached thereto removes a phase separation of the synthetic silica particle and the perlite particle, thereby forming the structure of the expanded perlite in which glass is fragmented at a size of 1 to 300 μm and the synthetic silica.

FIG. 1 is an electron micrograph of a cut surface of an insulator according to a exemplary embodiment of the present invention. Here, FIG. 1A is an electron micrograph of a cross section of the insulator manufactured by the method according to the exemplary embodiment of the present invention using the synthetic silica and the expanded perlite. When enlarging a portion of the insulator, it may be appreciated from FIG. 1B that a piece of the expanded perlite forms the framework. The synthetic silica particles are uniformly dispersed on the surface of the perlite particles and thus the insulator having excellent molding strength while keeping insulation performance may be manufactured in a form in which a boundary between the phases is obscure. Generally, at the time of simply mixing the synthetic silica and the expanded perlite, the phase separation occurs in a state in which the synthetic silica and the expanded perlite are coagulated to each other. When manufacturing the insulator using the synthetic silica and the expanded perlite and confirming the cross section thereof, the synthetic silica is coagulated as illustrated in FIG. 1C and the expanded perlite is fragmented and thus is dispersed, being coagulated to each other as illustrated in FIG. 1D. In this case, a coagulated group of the synthetic silica has a weak binding strength and thus may be easily damaged and a coagulated group of the perlite suffers from a convection and conduction phenomenon to have high thermal conductivity.

In the photograph of FIG. 1A, a form like a wad of cotton is the synthetic silica and particles having a sharp form are perlite particles. When simply mixing the synthetic silica and the perlite at a speed less than 1000 rpm, the synthetic silica and the perlite are not dispersed in the coagulated form and thus the phase separation like the synthetic silica of FIG. 1C and the perlite of FIG. 1D is made, such that the synthetic silica and the perlite are separately coagulated. However, FIG. 1A illustrates the form in which the synthetic silica particles are uniformly dispersed on the surface of the expanded perlite by the mixing method according to the exemplary embodiment of the present invention but the FIG. 1C illustrates only the synthetic silica or FIG. D illustrates only the expanded perlite, and therefore, the form of FIG. 1A is clearly different from the forms of FIGS. 1C and 1D. When enlarging a portion in FIG. 1A, it may be appreciated from FIG. 1B that the piece of the expanded perlite configures the framework.

Therefore, in the molded structure according to the exemplary embodiment of the present invention, the perlite in which glass is fragmented forms the framework among the synthetic silica particle groups, such that the molded structure according to the exemplary embodiment of the present invention has molding strength more excellent than that of the molded structure configured only of the synthetic silica particles having fluidity to overcome the manufacturing limitation of the low density molded product, thereby manufacturing the lower density molded product.

The synthetic silica is used to lower the thermal conductivity and as the synthetic silica, the fumed silica, the porous silica, the aerogel, the white carbon, and the like of which the particles have a size from several nanometer to tens of micro are used and when the content of the synthetic silica is 50 to 98 wt % and is equal to or less than 50 wt % for a total weight, the insulation performance is very low and when the content of the synthetic silica is equal to or more than 98 wt %, the insulation physical properties may be excellent but the molding strength may be reduced.

The expanded perlite is manufactured by drying perlite ore and then expanding it, in which the perlite ore is at least one selected from pearlstone, pitchstone, obsidian, and pumice stone. When the content of the expanded perlite for the total weight is equal to or less than 2 wt %, the molding strength may be reduced and when the content of the expanded perlite is equal to or more than 50 wt %, the insulation physical properties may be very reduced.

The kind, form, and structure of the mixer are not limited, but a mixer having a high speed rpm and a force which may pulverize a spherical and polyarchy perlite at the time of mixing to form particles having a fragmented shape and separates the synthetic silica particles from each other and coats, disperse, and mix the synthetic silica particles on the surfaces of the perlite particles in which particulate particles are fragmented may be used.

To perform more efficient mixing, the mixer is provided with a blade, in which the blade may be mounted at top and bottom shafts or left and right shafts. Further, a mixer which is designed to rotate the blade and a container in an opposite direction to gravity may also be used. The blade may have a straight shape or a cruciform shape and a circular blade and a multi-blade may be used.

As an operating time and a rpm of the mixer are increased, the mixer may be efficient, but physical properties of the mixer may not be increased from a predetermined time. To increase productivity, a method for shortening the operating time and increasing the rpm may be efficient. However, when the mixer is less than 1000 rpm, only the simple dispersion is made and the expanded perlite particles are not fragmented or particles exceeding 300 μm are present, and as a result, the effect of the mixer is reduced.

When the size of the perlite particles in which glass is fragmented is 1 to 300 μm, the perlite particles are well dispersed within the molded product and may serve as the structural support, when the size of the perlite particles is less than 1 μm, the perlite particles may be dispersed well but the molding strength is reduced, and when the size of the perlite particles exceeds 300 μm, the molding strength may be increased but the dispersibility may be reduced and the thermal conductivity may deteriorate. The size of the perlite particles in which glass is fragmented may be conditionally selected by controlling the operating time or the rpm of the mixer and the size of the perlite particle may be a standard sieve or may be measured using a particle size analyzer.

As the reinforced fiber, a glass fiber, a mineral fiber, an inorganic fiber including zirconium, and the like, and an organic fiber including polyethylene, polypropylene, polyester, nylon, and the like may be used.

The insulator requires hydrophobic (water repellent) performance depending on use conditions and environment. When the insulator absorbs moisture, the insulator has suddenly deteriorating thermal conductivity and thus has reduced insulation performance. The reason is that thermal conductivity of water is high as approximately 0.6 W/Mk and the convection phenomenon, and the like is increased due to internal moisture. (hereinafter, hydrophobicity (water repellency) is represented by hydrophobicity)

The hydrophobic treating method of the synthetic silica insulator performs hydrophobic treatment on synthetic silica particles to manufacture a molded product or mixes particles with a hydrophobic treating agent and molds the mixture to manufacture a molded product. Further, the hydrophobic treated synthetic silica and hydrophilic synthetic silica (general) are used together and compressed, and thus the hydrophobic treated synthetic silica protects the hydrophilic synthetic silica to ensure the hydrophobic performance.

As the hydrophobic treating method, all the methods described above may be used. Since an object of the present invention is to reinforce the strength and prevents the specific surface area from reducing by using the binder, it is more preferable to use the synthetic silica and the general synthetic silica which is simply mixed. In this case, the reason why the present invention does not use the binder is to maximally increase the specific surface area of the synthetic silica. In this case, only the hydrophobic treated synthetic silica is used or when the hydrophobic treating agent is mixed with the hydrophobic treated synthetic silica at the time of molding, the specific surface area is reduced. In particular, the case in which the hydrophobic treating agent is mixed shows a similar phenomenon to the case in which the binder is mixed.

Hereinafter, the mold machine which is used in the second step will be described.

FIG. 2 is a schematic diagram of the mold machine according to the exemplary embodiment of the present invention. As illustrated in FIG. 2, the mold machine according to the exemplary embodiment of the present invention includes an upper plate, a lower plate, and a side wall plate.

The upper plate 10 includes an upper porous plate 11 which is provided with a plurality of pores, an upper filter 12 which is positioned thereon, and an upper press plate 13 which is positioned on the upper filter 12 and the lower plate 20 corresponding to the upper plate 10 includes a lower porous plate 21, a lower filter 22 which is positioned therebeneath, and a lower press plate 23 which is positioned beneath the lower filter 22.

In this configuration, the upper filter 12 and the lower filter 22 have pores enough to prevent the synthetic silica and the perlite particles from being discharged.

FIG. 4 is a schematic operation diagram of a compression mold machine according to the related art. The compression mold machine according to the related art is configured to include an upper plate and a lower plate which does not have pores to perform compression molding. At the time of the compression molding using the existing compression mold machine, when powders are compressed by a pressure, air included therein is not smoothly discharged and thus the powders and air are pressed together. As a result, an internal pressure is higher than an atmospheric pressure and thus the effect of the expanded perlite used as the structural support deteriorates. Consequently, air is discharged through a gap between the upper plate and the side wall. In this case, a dispersion deviation may occur due to a difference in size or specific gravity of particles due to the flow of generated air.

FIG. 3 is a schematic diagram of the mold machine according to the exemplary embodiment of the present invention. As illustrated in FIG. 3, when performing the compression molding by the mold machine according to the exemplary embodiment of the present invention, a pre-press atmospheric pressure P1 starts at the same pressure as an air pressure P2 in the powder and as the compression proceeds, the internal air pressure P2 is larger than the P1. In this case, since an inside and an outside of the mold machine may not be completely sealed, the internal air pressure P2 needs to be discharged outside the mold machine to form a phase balance with the atmospheric pressure P1. In FIG. 3, an arrow illustrates a flow of air.

That is, in general mold machine, a gap is present between the pressed upper plate and the side wall and thus as illustrated in FIG. 4B, air is discharged through the gap. As the size (area of a plate) of the molded product and the compressed state of the power are increased, air is not easily discharged, and thus the internal air pressure P2 is higher than the atmospheric pressure P1 and a place at which the pressure is locally high occurs, such that the specific surface area (internal pore) is non-uniformly formed and the effect of the expanded perlite forming the structural support is reduced.

In the molded machine according to the exemplary embodiment of the present invention, since the upper porous plate 11 and the lower porous plate 21 are provided with a plurality of pores, as illustrated in FIG. 3B, air is easily discharged and thus the internal air pressure P2 and the atmospheric pressure P1 are almost constantly maintained and the specific surface area is uniformly formed, such that the expanded perlite may obtain an effect of forming the structural support.

When the hydrophobic treated synthetic silica and the general synthetic silica are used to give the hydrophobicity, the effect is more effective. The reason is that the hydrophobic treated synthetic silica has a surface tension lower than that of the general synthetic silica and thus flowability is improved. Here, the flowability represents moving while easily reacting to external pressure.

In the case of FIG. 4 which is the existing molding method, the internal pressure is increased and then is affected while air is discharged through the gap between the upper plate and the side wall, thereby causing the dispersion deviation. However, in the mold machine according to the exemplary embodiment of the present invention, as illustrated in FIG. 3, the internal air is easily discharged upwardly and downwardly, and thus the internal non-uniformity may be prevented and the internal air flowing phenomenon may be suppressed.

As the filters 12 and 22 which are used in the upper plate 10 and the lower plate 20 of the mold machine, an organic-based fiber, an inorganic-based fiber, an organic-based foam, an inorganic-based foam, or a metal filter which may effectively remove the internal air may be used.

Further, when the mold machine using the method for simultaneously compressing the upper plate 10 and the lower plate 20 vertically is used, the effect may be more improved. The general compression molding takes a form in which the upper plate 10 descends and is then compressed. In this case, comparing with the compressed states of the upper and lower portions of the powder which starts to be compressed, the upper portion of the powder has the compressed state higher than that of the lower portion of the powder. As the thickness of the molded insulator is increased, the difference is increased. When the density deviation between the upper and lower portions of the so manufactured insulator occurs, the strength and the thermal conductivity are non-uniform. To improve the above problem, a method for simultaneously compressing the upper plate 10 and the lower plate 20 to improve the density deviation between the upper and lower portions of the molded insulator and the non-uniform internal specific surface area may be used.

The insulator manufactured by the present invention may be used as an insulator and may also be additionally applied.

First, the insulator may be used as the core of the vacuum insulator and may be additionally used as an outer cover having a structure in which a film of aluminum and an organic material is multilayered. According to the exemplary embodiment of the present invention, the organic material forming the film is not limited, and therefore polyethylene, polypropylene, polyethyleneterephthalate, polycarbonate, nylon, ethylenevinylalcoholpolymer (EVOH), and the like may be used. The outer cover may be manufactured by a deposition method or a lamination method.

In this case, to reinforce the strength of the outer cover, a fiber of an inorganic material or an organic material may be further provided.

The film of the outer cover may preferably have a thickness of 10 to 1000 μm. The method for depositing or laminating the aluminum film on the film of the organic material is not particularly limited. As one example, the film of the organic material and the aluminum film are stacked and are heated and pressed at a temperature of 50 to 300° C. and 1 to 30 kgf/cm$^2$ and thus are deposited or laminated.

When the film thickness of the outer cover is equal to or less than 10 μm, the film of the outer cover is damaged due to external shock or scratch and thus the vacuum is highly likely to be broken and when the film thickness of the outer cover is equal to or more than 1000 μm, it is difficult to perform an operation such as folding the vacuum insulator after the manufacturing of the vacuum insulator or a loss of a thermal transfer through the outer cover may occur.

When the manufactured upper outer cover and lower outer cover are positioned in parallel with each other, the molded product of the inorganic powder manufactured in the second step is seated between the upper and lower outer covers, and then three surfaces of the upper outer cover and the lower outer cover are heated and pressed at a temperature of 50 to 300° C. and a pressure of 1 to 30 kgf/cm$^2$ by using heat fusion plate, the molded product is manufactured in a form in which it is inserted into a heat-fused pouch.

Next, upper and lower portions of opened one surface of the upper and lower outer covers are put in a vacuum chamber and air is removed, thereby forming vacuum. When the degree of vacuum rises to a predetermined value or more, the rest opened one surface is heat-fused to complete the vacuum insulator.

The degree of vacuum is different depending on the targeted thermal conductivity and as the degree of vacuum is high, the effect of convection is removed and thus the thermal conductivity is improved. In the present invention, a vacuum pressure of 1 torr or more is considered.

As the method for using an outer cover, there are a method for inserting a molded product into a previously fused envelope and a method for continuously supplying upper and lower outer covers, supplying a molded product therebetween, and then fusing three surfaces of the upper and lower outer covers.

Another application method may be used for an ultra-low-temperature insulator. In particular, another application method may be used for an insulator of an LNG ship. A type used as the LNG ship is largely classified into Mark III type and No 96 type from GTT Co.

The Mark III type has a structure in which a plywood plate is disposed between upper and lower surfaces and urethane is disposed therebetween and the No 96 type has a structure in which a rectangular parallelepiped box is formed of plywood and expanded perlite, rockwool, glasswool, and the like are filled therein. The plywood box is configured to have an inside additionally provided with several compartments to prevent a shock from being applied to an upper plate and a lower plate.

When the insulator according to the exemplary embodiment of the present invention is used as the LNG ship as described above, the molded product may be used alone or finishing materials may be used together to prevent a damage.

As the finishing materials, a finishing material on which the aluminum film for the vacuum insulator is deposited or laminated, a finishing material formed of an inorganic fiber, a finishing material formed of an organic material, and the like may be variously used.

At the time of manufacturing the vacuum insulator, an inner cover may be additionally used. At the time of the vacuum operation, a vacuum facility may be damaged due to dust generated from the core. To prevent this, the inner cover is used to enclose the core with a material which may serve as a filter in a non-woven form, a woven form, or the like As the inner cover, a sheet form or a paper form which is manufactured in a non-woven form or a woven form such as an inorganic fiber, an organic fiber, and a cellulose fiber is used.

Another application method may be used for an insulator which is used as a backup material such as a pipe through which a high-temperature and low-temperature fluid flows and a heater. The insulator may be used alone, but may be previously processed to meet a thickness or a form of the pipe by using the finishing material as described above to improve field constructability or may be used, being enclosed to meet a form in the field.

In the method configured of the two steps according to the exemplary embodiment of the present invention, it is possible to apply the compressed clad sheet in which the perlite particles having the shape of irregular fragments of glass using the expanded perlite are uniformly dispersed to form the framework among the synthetic silica. That is, in the first step, since the framework of the expanded perlite which is formed by dispersing the synthetic silica and the expanded perlite at a high speed is not fixed, the structure formed of the framework of the expanded perlite and the synthetic silica may be damaged due the external pressure or action. To prevent this, it is manufactured into the compressed clad sheet (hereinafter, referred to as a compressed clad sheet).

The important matter which needs to be considered at the time of manufacturing the compressed clad sheet is that the compressed surface is minimized to suppress the generation of air flow due to the compression.

Therefore, this may be solved by using the compression roller as illustrated in FIG. 5 and it may be manufactured in a compressed small particle form. Since a contact area by the roller is small, unlike the general compression mold machine, the air flow is suppressed by the applied pressure and thus the damage of the structure does not occur.

The so manufactured compressed clad sheet has the following two effects.

First, the two-stage compression mold machine proposed in the present invention is not used but the general compression mold machine may be used. The reason is that the compressed clad sheet having the framework is manufactured, and thus a compression ratio at the time of the compression molding is reduced, and the air flow generated at the time of the compression is reduced and thus the internal pressure is reduced. Further, the reason is that the particles form the structure in advance, and thus the strength is increased and the structure and the framework are little damaged.

Second, the processes which are performed by the two-stage compression mold machine are omitted and the insulator may be manufactured. However, the insulator is hardly used alone and therefore the finishing material needs to be used. When the compressed clad sheet having the framework is put in the finishing material and sealed, the insulator may be manufactured to have the desired form and strength. In particular, when the compressed clad sheet is manufactured, the compression roller may be repeatedly performed or the compression ratio may be increased to adjust the density of the compressed clad sheet.

When being used as the core of the vacuum insulator, the compressed clad sheet according to the exemplary embodiment of the present invention may be more conveniently applied. Since the core of the vacuum insulator which is proposed above is manufactured as a solid molded product, the core is mainly manufactured as a board type after the manufacturing of the vacuum insulator or at the time of the manufacturing of the vacuum insulator. However, when the core is used as the compressed clad sheet form, the core may be manufactured in the desired form before or after the vacuum, and therefore may be applied to more various products.

Hereinafter, this will be described in detail with reference to Examples.

According to the present invention, to confirm the characteristics of the insulator, the physical properties were compared by measuring the flexural strength and the thermal conductivity.

The flexural strength was measured based on KS F 4714 and three test pieces of the insulator were selected and measured and then an average value thereof was obtained and shown.

The thermal conductivity was based on an ASTM C 518 flat board heat transfer standard and the test piece was manufactured as the vacuum insulator having a size of 300×300×10 mm (length×breadth×height) and measured.

EXAMPLE 1

Manufacturing of Inorganic Powder Insulator of the Invention 101.4 g of fumed silica and 50.9 g of expanded perlite were mixed and then put in the mixer in which the blade is mounted. The mixer was operated at a speed of 2000 rpm for 60 seconds and the mixed powder was molded to have a size of 300×300×10 mm (volume of 0.9 L) using the compression mold machine configured to include the upper plate and the lower plate having pores, thereby manufacturing the insulator having a density of 170 kg/m$^3$.

EXAMPLE 2

Manufacturing of Inorganic Powder Insulator of the Invention 96.4 g of fumed silica and 45.9 g of expanded perlite were mixed and then put in the mixer in which the blade is mounted. 10 g of glass fiber as the reinforced fiber was sponged by a small mixer in advance and then was added in the mixer in which the powder is included. The mixer was operated at a speed of 2000 rpm for 60 seconds and the mixed powder was molded to have a size of 300×300×10 mm (volume of 0.9 L) using the compression mold machine configured to include the upper plate and the lower plate having pores, thereby manufacturing the insulator having a density of 170 kg/m$^3$.

EXAMPLE 3

Manufacturing of Inorganic Powder Insulator of the Invention

The powder which is mixed like Example 2 was manufactured. In this case, the powder which has a density (bulk density) of 42 kg/m$^3$ passed through the compression roller to be manufactured as the compressed clad sheet having the framework which has a density (bulk density) of 155 kg/m$^3$. The manufactured compressed clad sheet was molded to have a size of 300×300×10 mm (volume of 0.9 L) using the compression mold machine configured of the upper plate and the lower plate which have pores to manufacture an insulator having a density of 170 kg/m$^3$.

EXAMPLE 4

Manufacturing of Inorganic Powder Insulator of the Invention

The powder which is mixed like Example 2 was manufactured. In this case, the powder which has a density (bulk density) of 42 kg/m$^3$ passed through the compression roller to be manufactured as the compressed clad sheet having the framework which has a density (bulk density) of 155 kg/m$^3$. The manufactured compressed clad sheet was molded to have a size of 300×300×10 mm (volume of 0.9 L) using the compression mold machine configured of the upper plate and the lower plate which do not have pores to manufacture an insulator having a density of 170 kg/m$^3$.

EXAMPLE 5

Manufacturing of Inorganic Powder Insulator of the Invention

Likewise Example 1, the compressed clad sheet was molded to have a size of 300×300×10 mm (volume of 0.9 L) by using 76. 5 g of fumed silica, 36.5 g of expanded perlite, and 8.5 g of glass fiber as the reinforced fiber to manufacture an insulator having a density of 135 kg/m$^3$.

EXAMPLE 6

Manufacturing of Inorganic Powder Insulator of the Invention

Likewise Example 1, the compressed clad sheet was molded to have a size of 300×300×10 mm (volume of 0.9 L) by using 56.7 g of fumed silica, 27 g of expanded perlite, and 6.3 g of glass fiber as the reinforced fiber to manufacture an insulator having a density of 100 kg/m$^3$.

EXAMPLES 7 To 9

Manufacturing of Inorganic Powder Insulator of the Invention 382.8 g of fumed silica and 182.2 g of expanded perlite were mixed and then put in the mixer in which the blade is mounted. 42.5 g of glass fiber as the reinforced fiber was sponged by the small mixer in advance and then was added in the mixer in which the powder is included. The mixer was operated at a speed of 2000 rpm for 60 seconds and the mixed powder was compressed from the top and from the bottom using the compression mold machine configured of the upper plate and the lower plate which have pores to manufacture the insulator which has a size of 300×300×10 mm (volume of 4.5 L) and a density of 135 kg/m$^3$. The insulator which is hot-air-dried at 70° C. for 24 hours and 140° C. for 24 hours was cut by a thickness of 10 mm from the top based on the compressed direction of the upper plate of the mold machine, and thus three sheets of insulators of an upper plate (Example 7), a middle plate (Example 8), and a lower plate (Example 9) were manufactured.

EXAMPLES 10 To 12

Manufacturing of Inorganic Powder Insulator of the Invention 382.8 g of fumed silica and 182.2 g of expanded perlite were mixed and then put in the mixer in which the blade is mounted. 42.5 g of glass fiber as the reinforced fiber was sponged by the small mixer in advance and then was added in the mixer in which the powder is included. The mixer was operated at a speed of 2000 rpm for 60 seconds and the mixed powder was compressed using the compression mold machine configured of the upper plate and the lower plate which have pores to manufacture the insulator which has a size of 300×300×10 mm (volume of 4.5 L) and a density of 135 kg/m$^3$. The insulator which is hot-air-dried at 70° C. for 24 hours and 140° C. for 24 hours was cut by a thickness of 10 mm from the top based on the compressed direction of the upper plate of the mold machine, and thus three sheets of molded products of an upper plate (Example 10), a middle plate (Example 11), and a lower plate (Example 12) were manufactured.

COMPARATIVE EXAMPLE 1

Manufacturing of Insulator Using Inorganic Powder to Which Binder is Applied 96.4 g of fumed silica and 45.9 g of expanded perlite were mixed and then put in the mixer in which the blade is mounted. 10 g of glass fiber as the reinforced fiber was sponged by the small mixer in advance and then was added in the mixer in which the powder is included. 10 g of liquid-phase PVAC as the binder was put in the mixer, the mixer was operated at a speed of 300 rpm for 60 seconds, and then the mixed powder was molded to have a size of 300×300×10 mm (volume of 0.9 L), thereby manufacturing the insulator having a density of 171 kg/m$^3$.

COMPARATIVE EXAMPLE 2

Manufacturing of Insulator by Low Speed Mixing 96.4 g of fumed silica and 45.9 g of expanded perlite were mixed and then put in the mixer in which the blade is mounted. 10 g of glass fiber as the reinforced fiber was sponged by the small mixer in advance and then was added in the mixer in which the powder is included. The mixer was operated at a speed of 900 rpm for 60 seconds and the mixed powder was molded to have a size of 300×300×10 mm (volume of 0.9 L) using the compression mold machine configured to include the upper plate and the lower plate having pores, thereby manufacturing the insulator having a density of 170 kg/m$^3$.

COMPARATIVE EXAMPLE 3

Manufacturing of Insulator Using General Compression Mold Machine 96.4 g of fumed silica and 45.9 g of expanded perlite were mixed and then put in the mixer in which the blade is mounted. 10 g of glass fiber as the reinforced fiber was sponged by the small mixer in advance and then was added in the mixer in which the powder is included. The mixer was operated at a speed of 2000 rpm for 60 seconds, and then the mixed powder was molded to have a size of 300×300×10 mm (volume of 0.9 L), thereby manufacturing the insulator having a density of 170 kg/m$^3$.

EXPERIMENTAL EXAMPLE 1

Comparing Physical Properties Depending on Molding Method for Each Density

Table 1 according to the present invention. The above Example 1 does not have fiber but shows strength slighter than that of the Comparative Examples and as the density is decreased, the above Examples 2, 5, and 6 in which the fiber is uniformly included have the gradually decreasing flexural strength but the gradually increasing insulation performance. The above Examples 3 and 4 manufactured the insulator using the compressed clad sheet having the framework and do not have a special difference from the above Example 2. In particular, it might be appreciated from the above Example 4 that the insulator may be manufactured without damaging the structure even in the case of using the general compressed mold machine.

Comparing with the above Example, the above Comparative Example 1 has the lower flexural strength and the deteriorating insulation performance due to the internal specific surface area under the same condition. Further, the higher strength than that of the present invention may be given by increasing the usage of the binder, but as the usage of the binder is increased, the internal specific surface area is reduced and thus the insulation performance is reduced, and therefore only a small amount of binder is used to reinforce the strength.

Further, the correlation between the high speed mixer and the molding method according to the present invention may

TABLE 1

Comparison of physical properties of insulator depending on density of molded product and molding method

| Division | Molding density (Kg/m$^3$) | Mixing speed of powder (rpm) | Feature | Flexural strength (gf/cm$^2$) | Thermal conductivity (mW/mK at 20° C.) |
|---|---|---|---|---|---|
| Example 1 | 170 | 2000 | Mount porous plate filter | 181 | 0.0207 |
| Example 2 | 170 | 2000 | Mount porous plate filter | 200 | 0.0209 |
| Example 3 | 170 | 2000 | Mount porous plate filter | 201 | 0.0210 |
| Example 4 | 170 | 2000 | General plate | 198 | 0.0209 |
| Example 5 | 135 | 2000 | Mount porous plate filter | 191 | 0.0205 |
| Example 6 | 100 | 2000 | Mount porous plate filter | 174 | 0.0203 |
| Comparative Example 1 | 171 | 300 | Use PVAC as binder in general plate | 178 | 0.0225 |
| Comparative Example 2 | 170 | 900 | Mount porous plate filter | No measurement | No measurement |
| Comparative Example 3 | 170 | 2000 | General plate | No measurement | No measurement |

Examples 1 to 6 manufactured the insulator according to the method for manufacturing an inorganic powder insulator appreciate from Comparative Examples 2 and 3 It might be appreciated that even though the structure is formed simply by the high speed mixer, the internal pressure is not removed and it has no effect.

EXPERIMENTAL EXAMPLE 2

Comparison Between Upper Compression Method of Powder and Upper/Lower Simultaneous Compression Method of Powder

TABLE 2

Comparison result of physical properties depending on upper compression molding method and upper/lower simultaneous compression molding method according to the related art

| Division | Mixing speed of powder (rpm) | Compression mold machine type | Compression method | Detailed Division | Measurement density (Kg/m³) | Flexural strength (gf/cm²) |
|---|---|---|---|---|---|---|
| Examples 7 to 9 | 2000 | Mount porous plate filter | Upper and lower simultaneous compression | Example 7 (Upper) | 136 | 190 |
| | | | | Example 8 (Middle) | 134 | 188 |
| | | | | Example 9 (Lower) | 135 | 188 |
| Examples 10 to 12 | 2000 | Mount porous plate filter | Upper compression | Example 10 (Upper) | 139 | 192 |
| | | | | Example 11 (Middle) | 129 | 181 |
| | | | | Example 12 (Lower) | 136 | 188 |

The present invention additionally proposed the use of the mold machine using the method for simultaneously compressing the upper plate and the lower plate from the top and from the bottom It might be appreciated from the Table 2 that to manufacture the insulator having the uniform density and the excellent flexural strength at the low density, the method for manufacturing a molded product using the method for simultaneously compressing the upper plate and the lower plate may be more preferable.

The examples for the application method proposed in the present invention will be additionally described.

EXAMPLE 13

Manufacturing of Vacuum Insulator Using Inorganic Powder Insulator of the Invention 96.4 g of fumed silica and 45.9 g of expanded perlite were mixed and then put in the mixer in which the blade is mounted. 10 g of glass fiber as the reinforced fiber was sponged by the small mixer in advance and then was added in the mixer in which the powder is included. The mixer was operated at a speed of 2000 rpm for 60 seconds and the mixed powder was molded to have a size of 300×300×10 mm (volume of 0.9 L) using the compression mold machine configured to include the upper plate and the lower plate having pores, thereby manufacturing the insulator having a density of 170 kg/m³. The core (for strength measurement) manufactured after being hot-air-dried at 70° C. for 24 hours and 140° C. for 24 hours was put in the outer cover which is deposited with an LDPE, nylon, and aluminum film and has a thickness of 90 µm and a size of 400×320 mm, sealed in the vacuum state, and folded a 400 mm portion, thereby manufacturing the vacuum insulator.

EXAMPLE 14

Manufacturing of Vacuum Insulator Using Inorganic Powder Insulator of the Invention The powder which is mixed like Example 13 was manufactured. In this case, the powder which has a density (bulk density) of 42 kg/m³ passed through the compression roller to be manufactured as the compressed clad sheet having the framework which has a density (bulk density) of 155 kg/m³. The compressed particles were put in the polypropylene non-woven envelope having 300×300×11 mm, put in the outer cover which is deposited with an LDPE, nylon and aluminum film and has a thickness of 90 µm, and a size of 400×320 mm, and folded a portion of 400 mm, thereby manufacturing the vacuum insulator.

EXAMPLE 15

Manufacturing of Insulator for LNG Transportation Using Inorganic Powder Insulator of the Invention 289.2 g of fumed silica and 137.7 g of expanded perlite were mixed and then put in the mixer in which the blade is mounted. 30 g of glass fiber as the reinforced fiber was sponged by the small mixer in advance and then was added in the mixer in which the powder is included. The mixer was operated at a speed of 2000 rpm for 60 seconds and the mixed powder was molded to have a size of 300×300×10 mm (volume of 2.7 L) using the compression mold machine configured to include the upper plate and the lower plate having pores, thereby manufacturing the core having a density of 170 kg/m³. The core (for strength measurement) manufactured after being hot-air-dried at 70° C. for 24 hours and 140° C. for 24 hours was put in the finishing material which is deposited with the LDPE, nylon, and aluminum film and has a thickness of 90 µm and a size of 400×370 mm, sealed in a general package vacuum state, and folded a 400 mm portion, thereby manufacturing the insulator.

EXAMPLE 16

Manufacturing of Insulator for LNG Transportation Using Inorganic Powder Insulator of the Invention 289.2 g of fumed silica and 137.7 g of expanded perlite were mixed and then put in the mixer in which the blade is mounted. 30 g of glass fiber as the reinforced fiber was sponged by the small mixer in advance and then was added in the mixer in which the powder is included. The mixer was operated at a speed of 2000 rpm for 60 seconds and the mixed powder was molded to have a size of 300×300×10 mm (volume of 2.7 L) using the compression mold machine configured to include the upper plate and the lower plate having pores, thereby manufacturing the core having a density of 170 kg/m³. The core (for strength measurement) manufactured after being hot-air-dried at 70° C. for 24 hours and 140° C. for 24 hours was packaged with the finishing material which is deposited with the LDPE and the nylon and aluminum film and has a thickness of 90 μm and a size of 420×420 mm.

EXAMPLE 17

Manufacturing of Insulator for LNG Transportation Using Inorganic Powder Insulator of the Invention The insulator was manufactured similar to Example 15 and the was additionally manufactured using E-glass having a thickness of 10 mm as the finishing material.

EXAMPLE 18

Manufacturing of Hydrophobic Insulator Using Inorganic Powder Insulator of the Invention 77.12 g of fumed silica, 19.28 g of hydrophobic fumed silica, and 45.9 g of expanded perlite were mixed and then put in the mixer in which the blade is mounted. 10 g of glass fiber as the reinforced fiber was sponged by the small mixer in advance and then was added in the mixer in which the powder is included. The mixer was operated at a speed of 2000 rpm for 60 seconds and the mixed powder was molded to have a size of 300×300×10 mm (volume of 0.9 L) using the compression mold machine configured to include the upper plate and the lower plate having pores, thereby manufacturing the insulator having a density of 170 kg/m³.

COMPARATIVE EXAMPLE 4

Manufacturing of Insulator Using LNC Ship NO 96 Method

An inside of a urethane board having a size of 300×300× 30 mm was dug at a size of 254×254×30 mm, a lower portion thereof was supported by the aluminum film, 107 g of expanded perlite was put in 254×254×30 mm, charged by a vibration at 40 Hz and an amplitude of 0.5 mm for 50 seconds, and an upper portion thereof was supported by the aluminum film, thereby manufacturing a sample insulator of which the thermal conductivity may be measured. (NO 96 is a method for charging expanded perlite particles and manufactures a sample for measuring thermal conductivity as described above).

EXPERIMENTAL EXAMPLE 3

Comparing Physical Properties for Each Application Method of Inorganic Powder Insulator of the Invention The thermal conductivity was measured by a ASTM C 177 protecting heat plate method. In particular, the thermal conductivity of the insulator for LNG ship was compared at ultra low temperature. The hydrophobic performance was confirmed by a method for measuring KS F 4714 water repellency. Only associated numerical values for each item was measured and written.

TABLE 3

| Division | Thermal conductivity (W/mK) | | | | Water repellency |
|---|---|---|---|---|---|
| | 20 | −40 | −80 | −159 | |
| Example 13 | 0.00421 | | | | — |
| Example 14 | 0.00420 | | | | |
| Example 15 | 0.00601 | 0.00473 | 0.00394 | 0.00276 | — |
| Example 16 | 0.0206 | 0.01854 | 0.01682 | 0.01170 | — |
| Example 18 | 0.022 | | | | 99.4% |
| Comparative Example 4 | 0.0408 | 0.0335 | 0.0289 | 0.0180 | — |

It might be appreciated from Example 13 that when the vacuum insulator was additionally manufactured using the insulator of the present invention as the core, 0.00421 W/mK performance is ensured. Unlike Example 13, it might be appreciated from Example 14 that the compressed clad sheet having the framework is used and thus it has little difference from Example 13. Examples 15 and 16 confirmed the insulation for LNG ship and showed more excellent performance than the existing Comparative Example 4. It might be appreciated from Example 18 that the hydrophobic and hydrophilic synthetic silica are mixed and thus the internal specific surface area is reduced, thereby slightly increasing the thermal conductivity but making the water repellency result excellent.

A plywood having the NO 96 shape was mounted in a shape like an insulating body using Example 17. The plywood was manufactured in a box having an internal space of 305*305 mm and a depth of 45 mm so as to meet a size of the sample. The E-glass which is a side of the insulator manufactured (at a size of 310*310*50 mm by additionally forming an outer cover of E-glass of 10 mm on an insulator of 300*300*30 mm) in Example 17 was put in the box in a form in which the E-glass is compressed by 5 mm. The opened upper portion is also covered with the plywood and even in this case, was fixed, being pressed by about 5 mm. The insulator put in the plywood box was not shaken within the plywood box while the E-glass being compressed in all directions, thereby preventing the aluminum deposition film from being damaged.

The above Examples and Experimental Examples, in particular, the structural forms, and the like are described but the present invention is not limited thereto, and therefore it may be appreciated that the examples of the present invention is changed by those skilled in the art within the scope of the present invention.

DESCRIPTION OF REFERENCE NUMERALS

10: Upper plate
11: Upper porous plate
12: Upper filter
13: Upper press plate
20: Lower plate
21: Lower porous plate
22: Lower filter
23: Lower press plate

The invention claimed is:
1. A method for manufacturing a low density inorganic powder insulator containing expanded perlite by a mixer, comprising:

a first step of manufacturing the inorganic powder by fragmenting expanded perlite and dispersing particulate synthetic silica in fragments of the expanded perlite; and a second step of manufacturing the insulator by compression-molding the inorganic powder to uniformly discharge air in the inorganic powder.

2. The method of claim 1, wherein the inorganic powder is configured to include 50 to 98 wt % of synthetic silica and 2 to 50 wt % of expanded perlite for a total weight.

3. The method of claim 1, wherein the first step is performed by the mixer at the same time.

4. The method of claim 1, wherein a speed of the mixer is equal to or more than 1000 rpm.

5. The method of claim 1, further comprising:
covering an insulator with an outer cover; and
heat-fusing a remaining one side of the outer cover after vacuum is formed up to a constant degree of vacuum.

6. The method of claim 5, wherein the insulator is configured to further include a finishing material.

7. The method of claim 6, wherein the outer cover is configured by depositing or laminating a film of aluminum and organic materials at more than one ply.

8. The method of claim 7, wherein the finishing material is any one selected from a finishing material deposited with the film of the aluminum and organic materials, a finishing material laminated with the film of the aluminum and organic materials, a finishing material formed of the inorganic fiber and a finishing material formed of the organic materials.

9. The method of claim 1, wherein the insulator is used as an insulator for fluid transportation, a pipe insulator for fluid plant, or a backup member for a heater.

10. The method of claim 1, wherein the compression molding is carried out using a mold machine comprising:
an upper plate configured to include an upper porous plate provided with a plurality of pores, an upper filter positioned on the upper porous plate, and an upper press plate positioned on the upper filter;
a lower plate configured to include a lower porous plate provided with a plurality of pores, a lower filter positioned beneath the lower porous plate, and a lower press plate positioned beneath the lower filter; and
when a low density inorganic powder is compressed, side plates configured to be adjacently connected to sides of the upper plate and the lower plate.

11. The method of claim 10, wherein the upper filter and the lower filter are made of at least any one of organic-based fiber, inorganic-based fiber, organic-based foam, and inorganic-based foam.

12. The method of claim 10, wherein the upper plate and the lower plate are simultaneously compressed from the top and from the bottom.

13. A method for manufacturing a low density inorganic powder insulator containing expanded perlite by a mixer, comprising:
a first step of manufacturing the inorganic powder by fragmenting expanded perlite and distributing particulate synthetic silica in a fragment of the expanded perlite; and
a second step of manufacturing the insulator formed of a compressed clad sheet by compressing the inorganic powder by a compression roller.

14. The method of claim 13, wherein the inorganic powder is configured to include 50 to 98 wt % of synthetic silica and 2 to 50 wt % of expanded perlite for a total weight.

15. The method of claim 13, wherein the first step is performed by the mixer at the same time.

16. The method of claim 13, wherein a speed of the mixer is equal to or more than 1000 rpm.

17. The method of claim 13, further comprising:
covering an insulator with an outer cover; and
heat-fusing a remaining one side of the outer cover after vacuum is formed up to a constant degree of vacuum.

18. The method of claim 17, wherein the insulator is configured to further include a finishing material.

19. The method of claim 18, wherein the outer cover is configured by depositing or laminating a film of aluminum and organic materials at more than one ply.

20. The method of claim 19, wherein the finishing material is any one selected from a finishing material deposited with the film of the aluminum and organic materials, a finishing material laminated with the film of the aluminum and organic materials, a finishing material formed of the inorganic fiber and a finishing material formed of the organic materials.

21. The method of claim 13, wherein the insulator is used as an insulator for fluid transportation, a pipe insulator for fluid plant, or a backup member for a heater.

* * * * *